Figure 4:
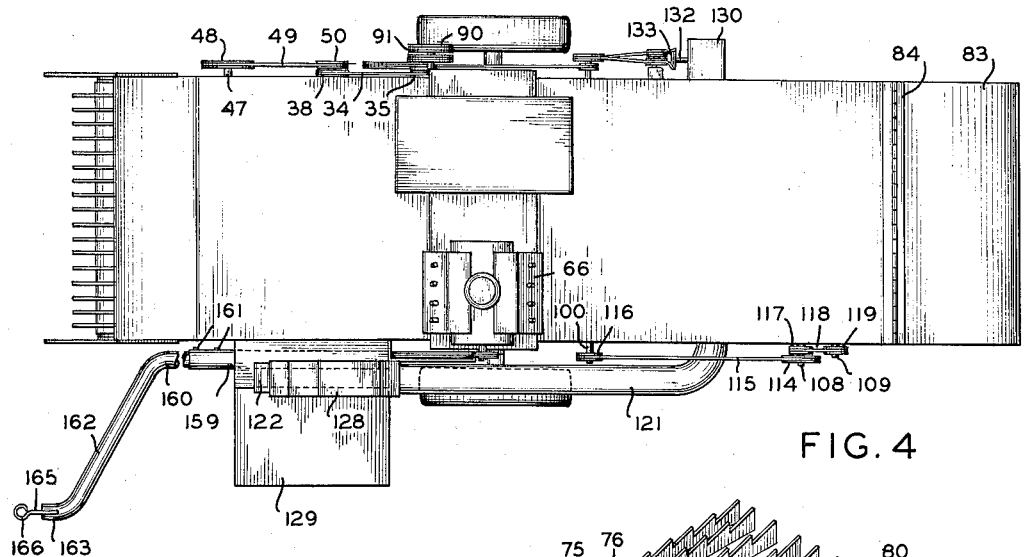

March 14, 1961 W. R. LONG 2,974,467
PICKUP AND THRESHING UNIT FOR PEANUT COMBINE
Filed June 12, 1958 6 Sheets-Sheet 1
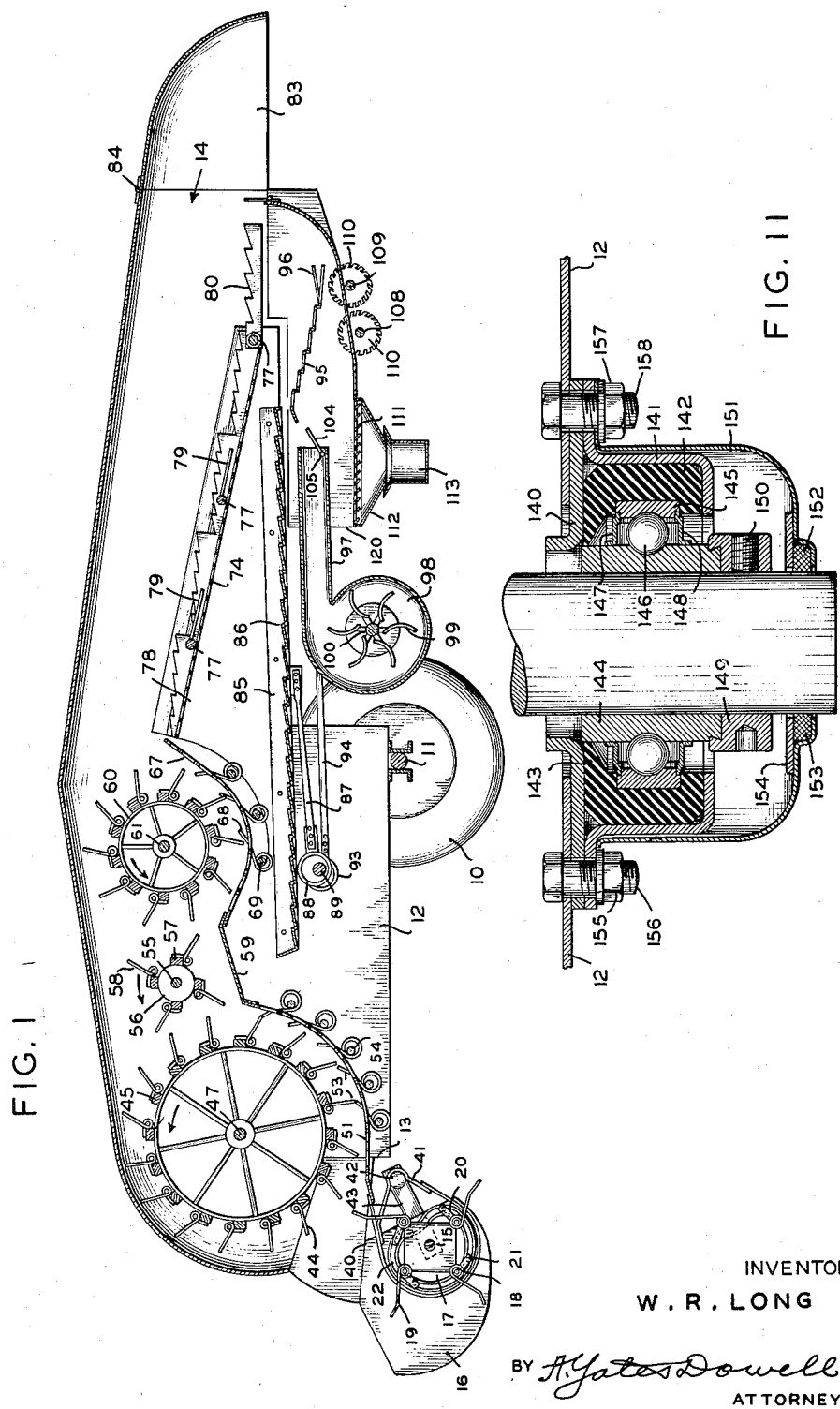
INVENTOR
W. R. LONG
BY *H. Gates Dowell*
ATTORNEY

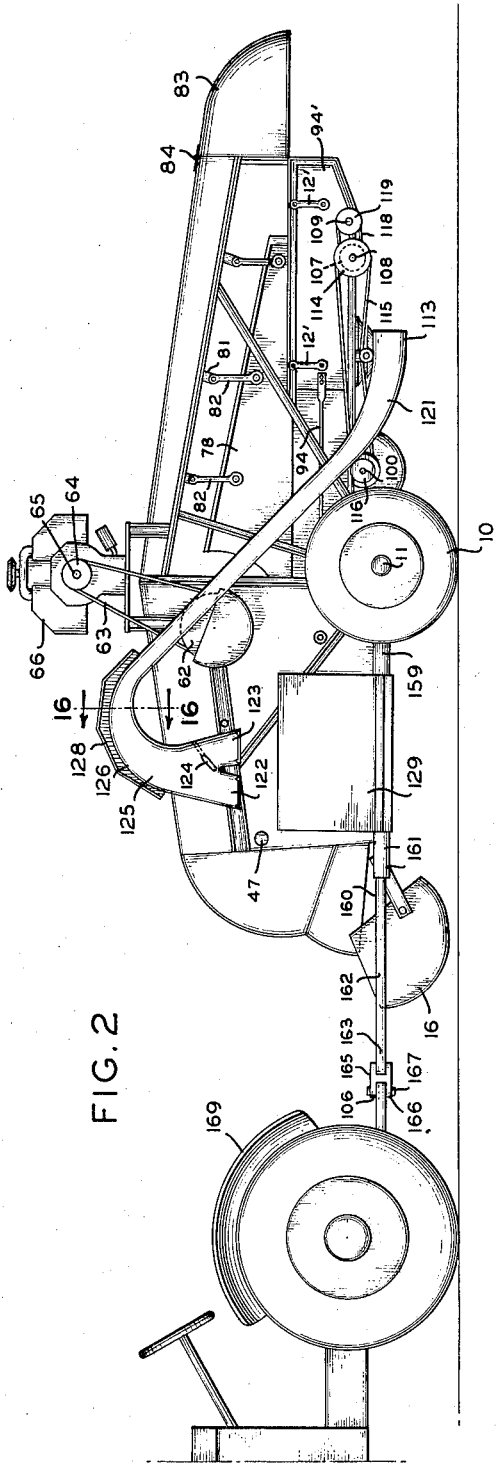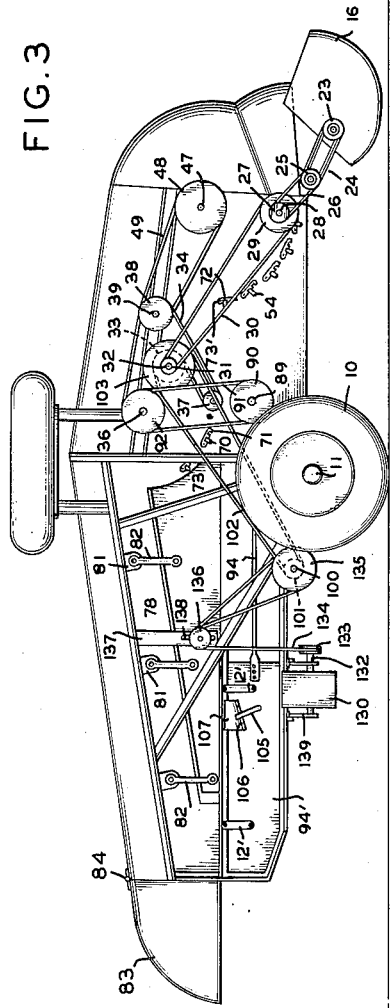

March 14, 1961 W. R. LONG 2,974,467
PICKUP AND THRESHING UNIT FOR PEANUT COMBINE
Filed June 12, 1958 6 Sheets-Sheet 3

INVENTOR
W. R. LONG

BY *A. Yates Dowell*
ATTORNEY

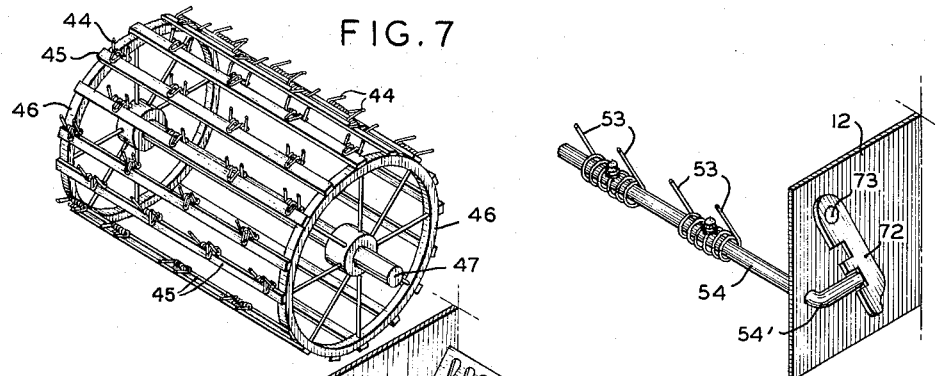
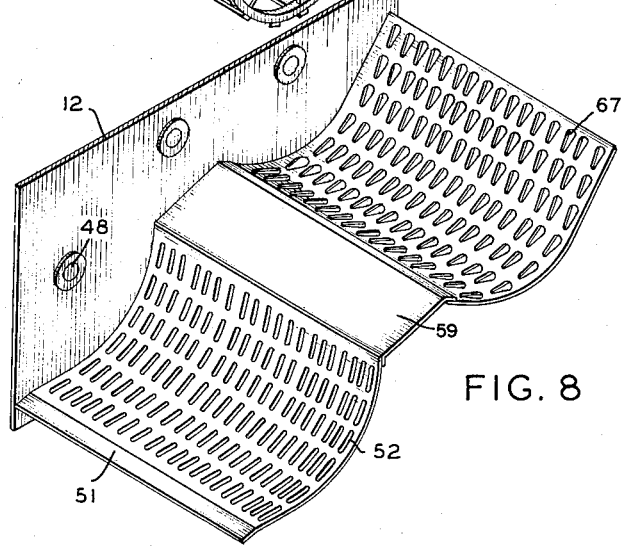
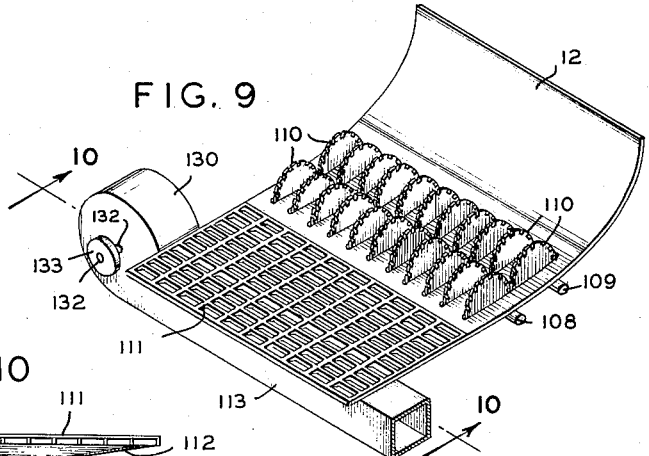

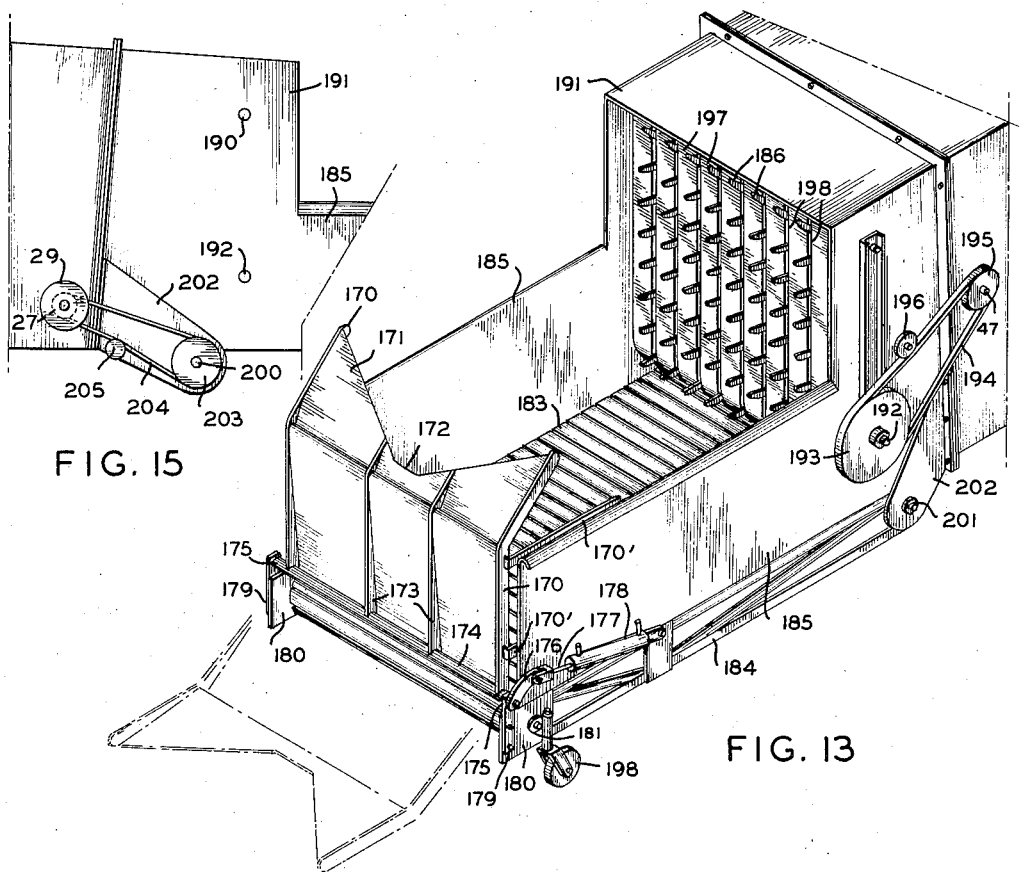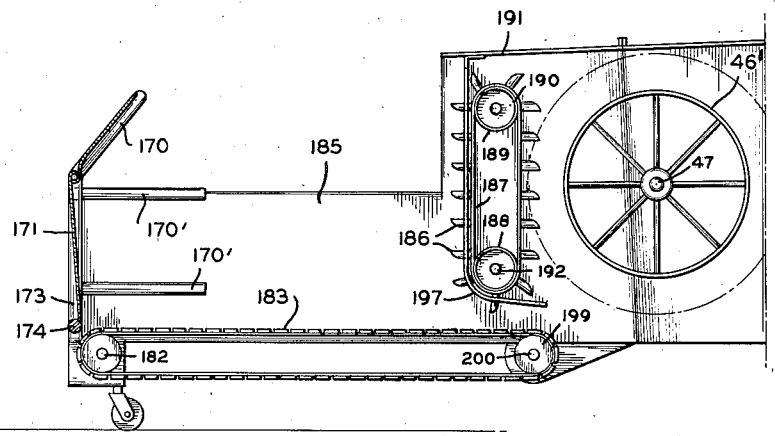

March 14, 1961 W. R. LONG 2,974,467
PICKUP AND THRESHING UNIT FOR PEANUT COMBINE
Filed June 12, 1958 6 Sheets-Sheet 6

INVENTOR
W. R. LONG
BY *H. Yates Dowell*
ATTORNEY

United States Patent Office 2,974,467
Patented Mar. 14, 1961

2,974,467
PICKUP AND THRESHING UNIT FOR PEANUT COMBINE

William Redden Long, Tarboro, N.C., assignor to Long Manufacturing Company, Tarboro, N.C.

Filed June 12, 1958, Ser. No. 741,665

5 Claims. (Cl. 56—19)

This invention relates to agriculture or the cultivation of the soil and to machinery employed in the pursuit thereof, specifically to agricultural machinery or the like employed in the gathering of vines with fruit thereon, and to the separation cleaning and collection of such fruit free of the vines in bags or other containers.

The invention is concerned particularly with the collection of peanut vines with the peanuts attached from the ground or windrow, the detachment of the peanuts from the vines, the cleaning of the peanuts and removal of short stem sections therefrom and finally the collection of the peanuts in suitable containers.

Machines employed for the threshing or picking of peanuts from the vines on which they have grown have employed relatively long conveyors requiring substantial space for their accommodation and rendering these machines bulky cumbersome heavy and expensive. Likewise these machines have lacked durability, have included bearings not properly supported or protected, were costly to operate and maintain, and they did not clean in the best possible manner.

It is an object of the invention to provide a peanut picker or combine which will pick up peanut vines with the nuts thereon directly from the ground or windrow without a separate conveyor, will separate peanuts from the vines to which they are attached, will remove the stems as well as clean the peanuts, and will discharge them into suitable bags or other containers.

Another object of the invention is to provide a machine of the character indicated which is compact, of simple and inexpensive construction, efficient in operation, requiring minimum effort to operate and maintain and in which the working parts of the machine are mounted resiliently on anti-friction bearings multiply sealed to exclude destructive dirt or foreign matter.

Another object of the invention is to provide a machine in the form of a trailer capable of being attached to a towing vehicle centrally or at either side of the same to make it possible to use the same to a maximum degree with only a minimum investment in the machine.

A further object of the invention is to provide a machine of the character indicated having a pick-up in combination with a novel type of breastplate, and with advancing and stripping cylinders which cause the movement of the vines through the machine and strip or detach the peanuts therefrom.

Figure 5:
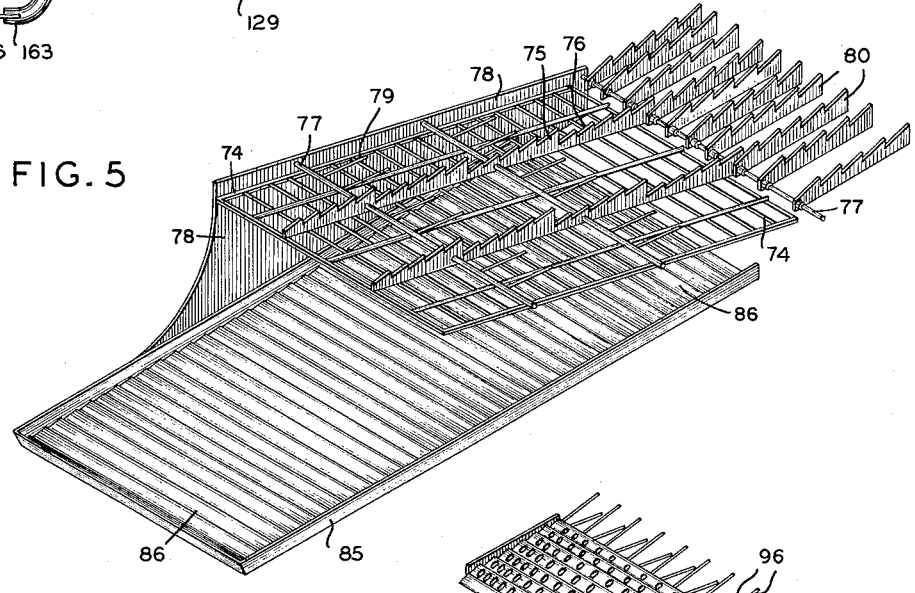
Figure 6:
Figure 16:
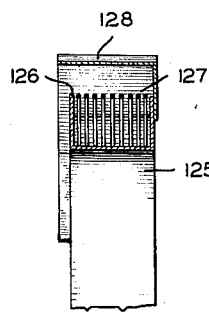
Figure 17:
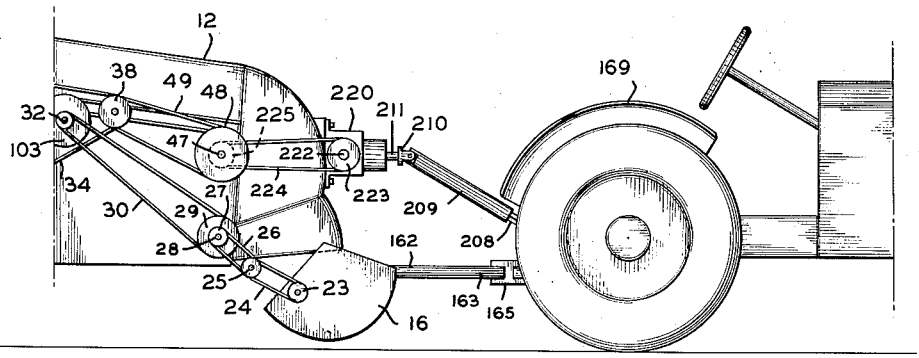
Figure 18:
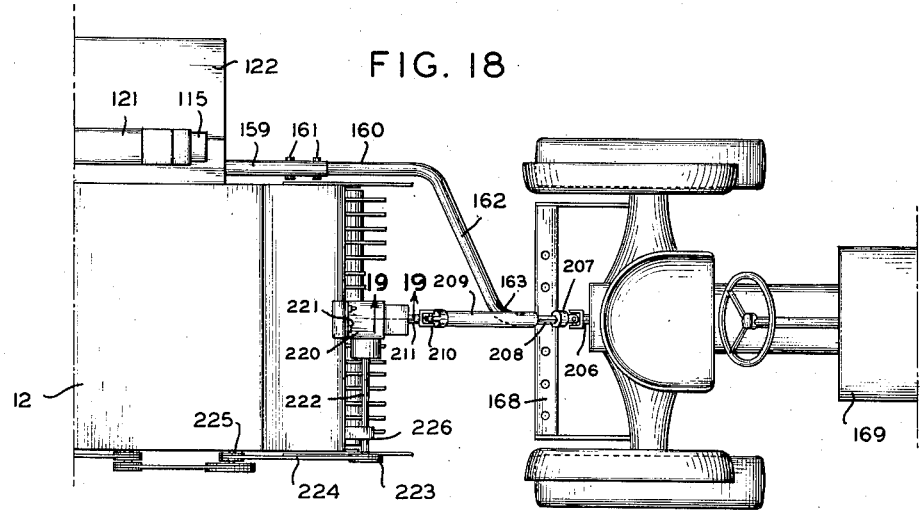
Figure 19:
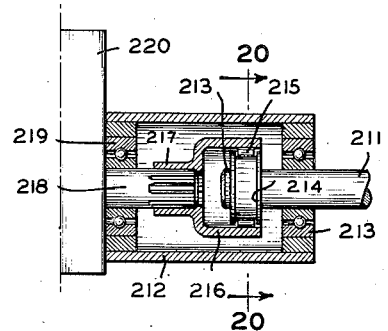

Other objects and advantages of the invention will be apparent from the following description taken in conjunction with the accompanying drawings wherein:

Fig. 1 is a longitudinal section substantially on the centerline of a peanut picker or combine illustrating one application of the invention;

Fig. 2, a left side elevation of the combine of Fig. 1 on a reduced scale;

Fig. 3, a right side elevation of the combine of Fig. 1 on a reduced scale;

Fig. 4, a top plan view of the combine of Fig. 1 on a reduced scale;

Fig. 5, an enlarged detailed perspective of the vine and nut moving mechanism;

Fig. 6, an enlarged fragmentary detailed perspective of the vine and nut separating grating;

Fig. 7, a perspective of the vine moving cylinder;

Fig. 8, a perspective of the breast plate;

Fig. 9, a fragmentary detailed perspective of the de-stemming knives, grill and blower mechanism;

Fig. 10, a section on the line 10—10 of Fig. 9;

Fig. 11, an enlarged section along the diameter of one of the bearings which support the shafts of the machine;

Fig. 12, an enlarged fragmentary perspective of one of the shafts which support the stripping fingers and including an adjustable positioning lever for such shaft;

Fig. 13, a perspective of a modified pick-up illustrating a fork lift and conveyor for use when peanut vines are stacked for drying;

Fig. 14, a longitudinal section of the pick-up of Fig. 13;

Fig. 15, a fragmentary right side elevation of the driving means for the conveyor of Fig. 13;

Fig. 16, an enlarged section on the line 16—16 of Fig. 2;

Fig. 17, a side elevation of a modified source of power;

Fig. 18, a top plan of the embodiment of Fig. 17;

Fig. 19, an enlarged section on the line 19—19 of Fig. 18; and

Figure 20:
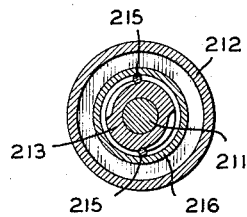

Fig. 20, a section on the line 20—20 of Fig. 19.

Briefly stated, the invention comprises a relatively simple compact structure including a series of cylinders, a breastplate, separate means for receiving and independently advancing the vines and the peanuts, and blower means for cleaning and separating dust and trash from the peanuts, as well as bags for separately collecting the peanuts.

The first of the cylinders has spring fingers which pick up or engage and elevate the vines slightly into contact with the spring fingers of a second cylinder which carries them along the adjacent concave slotted surface of the breastplate through the slots of which additional spring fingers project and maintain the progress of the vines. Subsequently the vines are engaged by the spring fingers of a smaller cylinder and moved across a flat intermediate portion of the breastplate. The vines then are engaged and elevated while the peanuts are stripped therefrom and fall through openings in a second concave portion of the breastplate onto a pan from which they are discharged and collected separately. The peanuts leaving the pan are subjected to fanning to separate the chaff and light particles and the vines and chaff fall into a bag or the like while rocks or heavier particles can roll over the grill through which the peanuts pass and be discharged through a separate opening to the exterior.

With continued reference to the drawings, the machine of the present invention comprises wheels 10 mounted on an axle 11 on which is supported a housing 12 having an inlet 13 and an outlet 14.

A pick-up for peanut vines with nuts attached is provided in the form of a shaft 15 journaled in spaced plates 16 and with a substantially rectangular plate 17 fixed to said shaft, one adjacent each of said spaced plates and forming supports for a series of rods 18 connecting corresponding corners of the plates and provided with vine engaging spring fingers 19 which engage and pick up the peanut vines. The rods 18 are provided with crank arms 20 having pins 21 located within and following the cam grooves 22 along the inside faces of the plates 16.

The shaft 15 is provided on one end with a pulley 23 (Fig. 3) driven by a belt 24 from a double pulley 25 driven by a belt 26 from a pulley 27 on a shaft 28. The shaft 28 has attached thereto a larger pulley 29 driven by a belt 30 from a pulley 31 on a shaft 32. The shaft 32 is driven by a pulley 33 from a belt 34 and a pulley 35 on a shaft 36.

The belt 34 extends about an idler pulley 37 supported on the housing 12 and also extends about the pulleys 33, 35 (Fig. 4) and 38 on the shaft 39.

Between the spring fingers 19 are mounted a series of curved bands 40 attached to supports 41 carried by a shaft 42 supported at its ends between plates 43, one at each end. The vines will be engaged and picked up by spring fingers 19 and will be carried directly into engagement with spring fingers 44 on spaced bars 45 mounted on a threshing cylinder 46' composed of spaced wheels 46 supported on a shaft 47 and driven by a pulley 48 and a belt 49 from a pulley 50 (Fig. 4) on shaft 39.

The threshing cylinder 46' rotates in a counter-clockwise direction to carry the vines rearwardly onto a breastplate 51 (Figs. 1 and 8) having slots 52 through which spring fingers 53 project and through which dirt can fall. The spring fingers 53 are mounted on shafts 54 and knock the peanuts from the vine as well as prevent the vine from falling back as it is advanced and elevated along the breastplate.

The vines are carried along the breastplate with the peanuts knocked loose or detached therefrom until the vines and the detached peanuts carried thereby reach the rear of the threshing cylinder where they are stripped therefrom by a stripper cylinder including a shaft 55 having a disk 56 at each end on which are mounted bars 57 carrying spring fingers 58. The spring fingers 58 travel in a counter-clockwise direction opposite the travel of the periphery of the threshing cylinder 46' stripping the vines therefrom and carrying them with the peanuts either on the vine or stripped therefrom over the imperforate central portion 59 of the breastplate 51 after which the nuts may drop through openings in the rear portion of the breastplate. The vines are removed from the stripper cylinder by means of a second threshing cylinder 60 similar to the threshing and stripper cylinders mounted on the shafts 47 and 55.

The threshing cylinder 60 is mounted on the shaft 61 having a pulley 62 (Fig. 2) driven by a belt 63 of a pulley 64 on the shaft 65 of an internal combustion engine 66. The rear concave portion of the breastplate is provided with pear-shaped opening 67 through which the peanuts fall. The spring fingers 68 are mounted on cross rods 69 and these spring fingers extend through the pear-shaped openings 67 and they shake loose any peanuts still clinging to the vines and prevent the vines from falling back as they are carried upwardly from the breastplate. The pear-shaped openings assist in detaching peanuts from their stems.

The shafts 54 and 69 are provided with upturned ends 54' and 70 and selectively applicable to a series of notched bars 71 and 72 mounted on a pivot 73 and 73' (Figs. 3 and 12). This permits the adjustment of the spring fingers 53 and 68 and the amounts they extend above the breast plate.

The vines carried beyond the breastplate, pass onto a vine rack where any nuts left on the vines are detached. This vine rack consists of a grid 74 having a pair of rib forming strips 75 provided with groups of angularly disposed serrated edges 76 adapted to engage and cause movement of the vines on said rack. The rack is mounted by means of rods 77 of which there are three having their ends journaled in side members 78. The first two of the members 77 are provide with spaced rearwardly disposed vine engaging fingers 79 adapted to move from a prone to a somewhat raised position and on the rear transverse rods 77 are mounted a series of substantially parallel serrated members 80 which engage and cause the discharge of the vines from the rack.

The rack is suspended within the housing by means of depending brackets 81 to which are pivoted links 82 attached to the rods 77, said links 82 being fixed to the first two of such rods 77 by means of a set screw or the like so that the fingers 79 will be caused to swing in an arc from a lower to a somewhat raised position due to the fact that they are carried by the rods 77.

The smaller rack is pivoted to the larger rack in order to be moved to eject the vines, the vines being discharged through the discharge outlet 14 to the exterior.

The discharge outlet 14 may be provided with a hood or extension 83 curved to deflect the vines earthward, such hood being attached to the housing 12 by a hinge 84 or any other desired means for securing the hood in fixed position.

Peanuts passing through the openings 67 in the rear portion of the breastplate 51 will be caught in a pan 85 having a washboard type bottom 86 with ribs tapered to provide shoulders. The pan 85 is carried by the side members 78, which is rapidly reciprocated by means of a connecting rod 87 connected to the eccentric 88 mounted on a shaft 89 (Figs. 1 and 3) driven by a double pulley 90 (Fig. 4) driven by a pair of belts 91 from a double pulley 92 from the shaft 36. A pair of eccentrics 93 also are driven by the shaft 89 connected to a pair of connecting rods 94 the opposite ends of which are connected to a pair of side plates 94' which are suspended from the framework of the machine by pivoted links 12'. The connecting rods 94 reciprocate the side plates 94' and consequently vibrate a screen 95 mounted therebetween similar to the pan 85 but smaller and with holes therethrough to let the peanuts fall downwardly and air to flow upwardly through and around the same to blow vines, dirt, small rocks and trash out of the rear end of the machine. The rear extremity of the member 95 is provided with tines 96 to direct stems and light material into position to be blown from the machine by means of air under pressure from the discharge end 97 of a blower 98, air pressure being produced by vanes 99 carried by a shaft 100, such shaft being provided with a pulley 101 (Fig. 3) driven by a belt 102 from a pulley 103 mounted on and driven by the shaft 32. The discharge end 97 of the blower 98 is provided with an adjustable valve or baffle member 104 mounted on a shaft 105, the end of which is turned upwardly and fits in the notches in a flange 106 on a bracket 107 so that it may be maintained in adjusted position.

Beneath the housing 12 at the rear of the machine are mounted a pair of shafts 108 and 109 on each of which are mounted a series of stemmer knives or saws 110 which project through the bottom of the machine for detaching the stems from peanuts discharged through the perforated screen 95 so that air from the blower 98 may blow the detached stems through the discharge opening 14. The peanuts being heavier slide forwardly down the incline of the bottom and fall by gravity through a grill 111 in the forward end of the bottom of the housing 12 and then through a flared member 112 into a pipe 113.

The shaft 108 is driven by a pulley 114 which is driven by belt 115 from pulley 116 mounted on the shaft 100. The shaft 108 also is provided with pulley 117 which drives belt 118 and pulley 119 mounted on the shaft 109.

Foreign substances such as relatively large rocks or other heavy objects will pass over the grill and be discharged through the opening 120 at the rear of the grill 111. Peanuts dropping into the pipe 113 will be discharged through a conveyor tube 121 to discharge openings 122 or 123 depending upon the position of adjustable valve 124. This permits the peanuts to be discharged through the discharge opening 122 until the bag suspended beneath the opening 122 can be filled at which time the valve 124 may be moved to divert or direct the peanuts through the discharge 123 to fill another bag suspended thereunder alternately during the use of the machine. The conveyor tube 121 includes an elbow 125 with an opening 126 providing an air vent and having spaced rods 127 for preventing the discharge of peanuts therethrough covered by a shield 128 so that dirt carried up through the tube will not be discharged into the bags. At the same time, this opening reduces the air pressure so that the peanuts are handled gently without injury. Below the discharge openings 122 and 123 is a platform 129 on which an operator and the bags to be filled may be supported.

Air for the pipe 113 is under pressure from a blower 130 having vanes 131 mounted on a shaft 132 which is driven by a pulley 133 driven by a belt 134 which in turn is driven by the pulley 135 attached to the shaft 100 (Fig. 3). Adjustable double pulley 136 being disposed between pulley 133 and pulley 135 on a bracket 137 having a slot 138 for adjusting the tension on the belt 134 and for changing the direction of the driving force from transverse to longitudinal. The blower shaft 132 is journaled in a pair of brackets 139 attached to the underside of the housing 12.

The shaft 47 of the feed cylinder and the shafts 55 and 61 of the stripper cylinders and the shaft 89 which carries the eccentrics are all journaled in a double seal rubber mounted bearing (Fig. 11) having a base plate 140, a Z-shaped retainer member 141 which confines a resilient bumper ring 142 which may be provided with a U-shaped extension on one end for engagement with the inner race 144 to form a seal therebetween. The outer race 145 is embedded in the resilient bumper ring 142 and the inner race 144 is rotated by means of a series of ball bearings 146 which engage the inner and outer races. A pair of shields 147 and 148 are attached to the outer race and slidably engage the inner race on each side of the ball bearings to form a second seal. A ring 149 is attached to one end of the inner race 144 and is fixed to the shaft by means of a set screw 150. A cup-shaped housing or shield 151 encloses the bearing and may be provided at its center with a recess 152 for the reception of a packing gland 153 which is held in position by retaining ring 154 attached to the housing or shield 151 in any desired manner. The base plate 140 and the retainer 141 may be attached to the housing 12 by nuts and bolts 155 and 156 and nuts and bolts 157 and 158 secure the base plate 140, the retainer 141 and the outer housing or shield 151 to the housing 12.

The peanut combine may be drawn by a pipe 159 attached to the undercarriage of the machine and such pipe may extend forwardly past the bagging platform. A second pipe or rod 160 is slidable and rotatable within the pipe 159 and is held in fixed position by nuts and bolts 161. The pipe 160 may have a portion 162 offset from the axis of the pipe 159 and at its outer end may have portion 163 substantially parallel to the axis of the pipe 159. The portion 163 may have a plate 165 attached thereto in any desired manner as by welding and such plate may be provided at its forward end with a pair of eyes 166 through which a pin 167 may be inserted to connect the machine to the tractor or other propelling vehicle 169.

In the field, the peanut combine may be towed outside the limits of the tractor (Fig. 4) or the machine may be drawn directly behind the tractor (Fig. 18) by removing the bolts and nuts 161 and reversing the offset pipe 162, then replacing the bolts and nuts 161 and reattaching the machine to the tractor.

Instead of placing the peanuts which have been dug in windrows, some farmers prefer to stack the peanuts around a pole placed in the ground. It would be difficult for the pick-up assembly described above to pick up the vines which have been stacked and feed them into the machine without causing damage and loss of the peanuts. Therefore, the front of the machine including the pick-up assembly may be removed from the housing and a stack pick-up assembly may be substituted therefor. The stack pick-up assembly comprises a fork lift having a pair of angular side members 170 and a plate 171 between the side members 170 which may be provided with a V-shaped cut-out 172 at its leading edge. A pair of braces 173 are beneath the plate 171 for additional strength. The angular side members 170 may have a pair of upstanding arms 170′ on each of the members 170 to confine the vines within the limits of the fork lift. The fork lift may be attached to a shaft 174 journaled in bearings 175 and may have an arm 176 attached to one end outside of the bearing. The other end of the arm may be connected to a hydraulic piston rod 177 and cylinder 178 which is utilized to pivot the fork lift around the bearings 175 to raise and lower such fork lift. The bearings 175 are held by a bearing retainer 179 which is secured to a pair of plates 180, one on each side mounted on the forward end of a conveyor assembly. The pair of plates 180 may be provided with bearings 181 for the reception of conveyor shaft 182 which drives a conveyor belt 183 composed of relatively narrow abutting slats or staves. The conveyor 183 may be mounted on a frame 184 and may have sides 185 to direct the vines into a feed mechanism which comprises a series of fingers 186 mounted on a belt 187 and driven by a cylinder 188 and passing around the cylinder 189. The cylinder 189 is attached to a shaft 190 which is journaled for free rotation in a housing 191, such housing being attached by screws or other attaching means to the front of the peanut combine.

The cylinder 188 is mounted on a shaft 192 journaled in the housing 191 and provided at one end with a pulley 193 driven by a belt 194 which is driven by a pulley 195 attached to the shaft 47. An idler pulley 196 is disposed intermediate the pulleys 193 and 195 to adjust the tension of the belt 194. The belt 187 moves in a counter-clockwise direction and feeds the vines into the threshing cylinder 46 so that the machine may operate as previously described. In order to protect the belt 187, a shield 197 may be attached to the housing 191 and may be provided with a series of relatively narrow slots 198 through which the fingers 186 are free to pass. The forward end of the conveyor 183 is supported above the ground by a pair of caster wheels 198, one being rotatably attached to each of the plates 180. The rear of the conveyor 183 passes around and is driven by a cylinder 199 mounted on a shaft 200 which is journaled in a bearing 201 mounted on a bracket 202 on each side of the machine. The shaft 200 has a pulley 203 mounted on one end which is driven by a belt 204 which in turn is driven by a pulley 27 with an idler gear 205 between the pulleys 203 and 27 to provide correct tension on the belt 204.

If desired, the tractor or other propelling vehicle 169 also may provide the power necessary to operate the peanut picker or combine as illustrated in Figs. 17–20. The conventional power take-off shaft 206 of the tractor 169 may have attached thereto a universal joint 207. The opposite end of the universal joint 207 is secured to a square shaft 208 slidably carried by cylinder 209 which has a universal joint 210 attached to its opposite end. The opposite end of the universal joint 210 is connected to shaft 211 which is journaled in housing 212 by bearings 213. The inner end of the shaft 211 is adapted to carry an overrunning clutch member 213 provided with a groove 214 which acts as a raceway for roller bearings 215. When the shaft 211 is rotated in one direction the roller bearings 215 engage the inner periphery of connecting member 216 which has a reduced end portion 217 adapted to fit on splined shaft 218. The shaft 218 is carried by bearing 219 and is the inlet to gear reduction box 220 which may be attached to the threshing cylinder housing by screws 221.

The power output of the gear reduction box 220 is conducted by a shaft 222 to pulley 223 which drives belt 224 which drives pulley 225 on shaft 47. The shaft 222 may be held in spaced relation with the housing by bracket 226 (Fig. 18).

Thus it is apparent that the peanut picker or combine of the present invention may include a self-contained internal combustion engine 66 or it may derive its power from the tractor or other propelling vehicle 169 through a conventional power take-off shaft.

The spring fingers of the threshing and stripper cylinders mounted on the shafts 47 and 55 respectively and the second threshing cylinder 60 preferably are yieldable rearwardly when they engage the vines to thereby avoid the vines being detained thereon sufficiently to clog the machine. The shape of the breast plate and associated parts directs the movement of the vines with the attached and unattached fruit, the openings 67 permitting the fruit to drop onto the pan 85 while the vines pass onto the vine rack 74.

The vine rack is relatively wide and long and is notched or serrated so that when it reciprocates it will cause the vines to be advanced down the rack, the flippers 79 cooperating toward such end. The pan 85 likewise is relatively wide and long and is provided with ribs which engage the peanuts and distribute them over the pan as well as advance them endwise upwardly along and from the pan due to the reciprocatory movement provided by the connection 87 with the eccentric 88 on the shaft 89.

The peanuts or other fruit is discharged on the screen 95 where it is subjected to air from the blower 98, tines 96 serving to direct straw or foreign matter into the air stream so that it can be blown through the opening 14 from the rear of the machine. After the peanuts are past the screen 95 they will pass through the grill 111 and down the inclined or flared walls 112 into the transverse pipe 113 merging with the gentle curvature into the air lift having the openings in its upper portion.

The present invention is compact due to the particular construction and arrangement of parts including the downwardly inclined surface area connected centrally with the air lift to thus reduce the overall height required and which is considerably less than it would be if there were a single elongated delivery chute. The combination of the pick-up or gathering device which engages peanuts directly on the windrow, the threshing and transfer cylinders, the multiple stage cleaning including the screen and the air lift with a grill in the upper portion of the air lift having openings small enough to prevent peanuts being carried therethrough but large enough to allow dirt, trash and other foreign matter to pass out with the air so that the peanuts may fall gently into collection receptacles without breakage.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a peanut combine relatively large threshing cylinder means having spring fingers for engaging the peanut vines, a pickup slightly ahead of and below said threshing cylinder means, said pickup being located near the earth and having fingers for engaging the peanut vines and for conveying them into contact with said threshing cylinder means, a breastplate located rearwardly of said pickup and beneath and in operative relation to said threshing cylinder means, said breastplate having openings therein and a series of spring fingers extending through said openings upwardly into the path of movement of the vines and operating in conjunction with the spring fingers on said threshing cylinder means for detaching the peanuts from the vines, the size elevation and relational arrangement of the pickup and the threshing cylinder means permitting the combine to be made of relatively low overall height.

2. The structure of claim 1 in which said threshing cylinder means comprises spaced multiple threshing cylinders one rearwardly and slightly higher than the other.

3. The structure of claim 1 in which said threshing cylinder means comprises spaced threshing cylinders and said breastplate includes perforated arcuate portions one beneath each of said threshing cylinders with an imperforate portion therebetween and with the openings beneath the rearmost threshing cylinder being of a size to permit the peanuts to fall therethrough.

4. The structure of claim 1 in which said pickup is of the reel type and with spring fingers for engaging the peanut vines.

5. The structure of claim 1 in which said pickup is of the conveyor type with means for supplying peanut vines to such conveyor.

References Cited in the file of this patent

UNITED STATES PATENTS

| | | |
|---|---|---|
| 1,179,786 | Walsh | Apr. 18, 1916 |
| 1,296,903 | Baker | Mar. 11, 1919 |
| 1,744,906 | Livermon | Jan. 28, 1930 |
| 1,959,689 | Ronning | May 22, 1934 |
| 2,169,472 | Oehler et al. | Aug. 15, 1939 |
| 2,388,212 | McElhoe et al. | Oct. 30, 1945 |
| 2,395,163 | Carroll | Feb. 19, 1946 |
| 2,648,577 | Watt | Aug. 11, 1953 |
| 2,695,485 | Krause et al. | Nov. 30, 1954 |
| 2,700,865 | Russell | Feb. 1, 1955 |
| 2,706,371 | Bishop | Apr. 19, 1955 |
| 2,826,464 | Hank et al. | Mar. 11, 1958 |
| 2,856,936 | Landrum et al. | Oct. 21, 1958 |